United States Patent [19]
White

[11] 4,083,787
[45] Apr. 11, 1978

[54] ROTARY VACUUM FILTER

[75] Inventor: Harold Robert White, New Lenox, Ill.

[73] Assignee: Alar Engineering Corporation, Chicago, Ill.

[21] Appl. No.: 715,675

[22] Filed: Aug. 19, 1976

[51] Int. Cl.² ............................................. B01D 33/06
[52] U.S. Cl. .................................................... 210/402
[58] Field of Search ................. 210/77, 402, 406, 416, 210/161, 217; 162/323, 330, 335, 357

[56] References Cited

U.S. PATENT DOCUMENTS 3,919,088  11/1975  Doncer et al. ........................ 210/402

FOREIGN PATENT DOCUMENTS 233,316  4/1911  Germany .............................. 210/402
5,219 of  1907  United Kingdom .................. 210/402

*Primary Examiner*—William A. Cuchlinski, Jr.

*Attorney, Agent, or Firm*—Hill, Gross, Simpson, Van Santen, Steadman, Chiara & Simpson

[57] ABSTRACT

A rotary vacuum filter apparatus has a filter drum with a rotating hollow through axle carrying radial pans arranged to scoop up filtrate in the bottom of the drum and raise the filtrate to a level for draining into the axle through holes so arranged as to prevent drainage of filtrate back into the drum. A pump draws air from the drum through the axle at high velocity providing an air lift sweeping the filtrate out of the axle for discharge from the filter unit. Two diametrically opposed pans spanning substantially the entire length of the drum can radiate from opposite sides of the axle or a plurality of diametrically opposed pairs of pans can be mounted along the length of the axle and radiate therefrom in circumferentially offset positions to provide a more continuous scooping action in the bottom of the drum and the axle can be drained from one or both ends.

20 Claims, 7 Drawing Figures

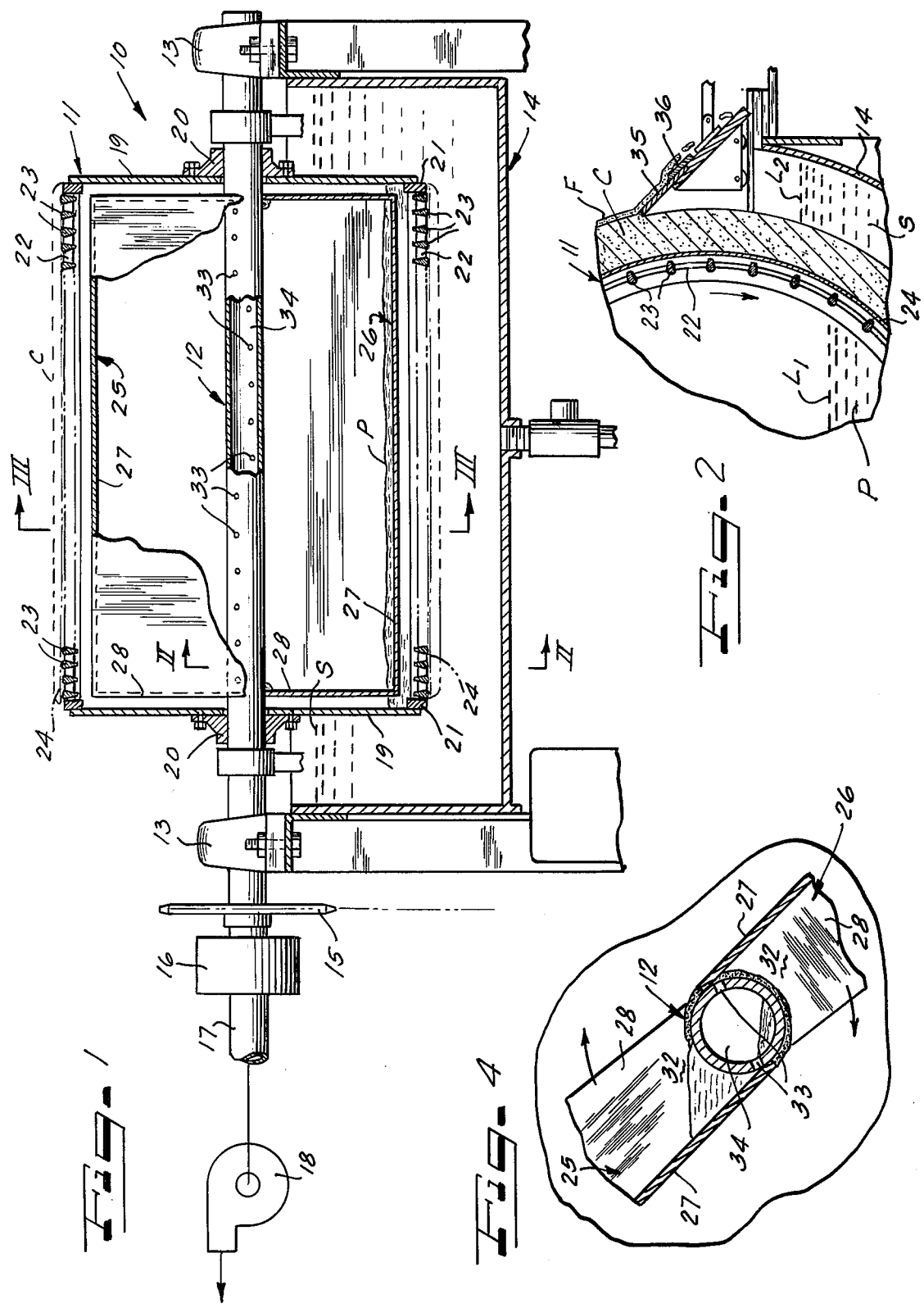

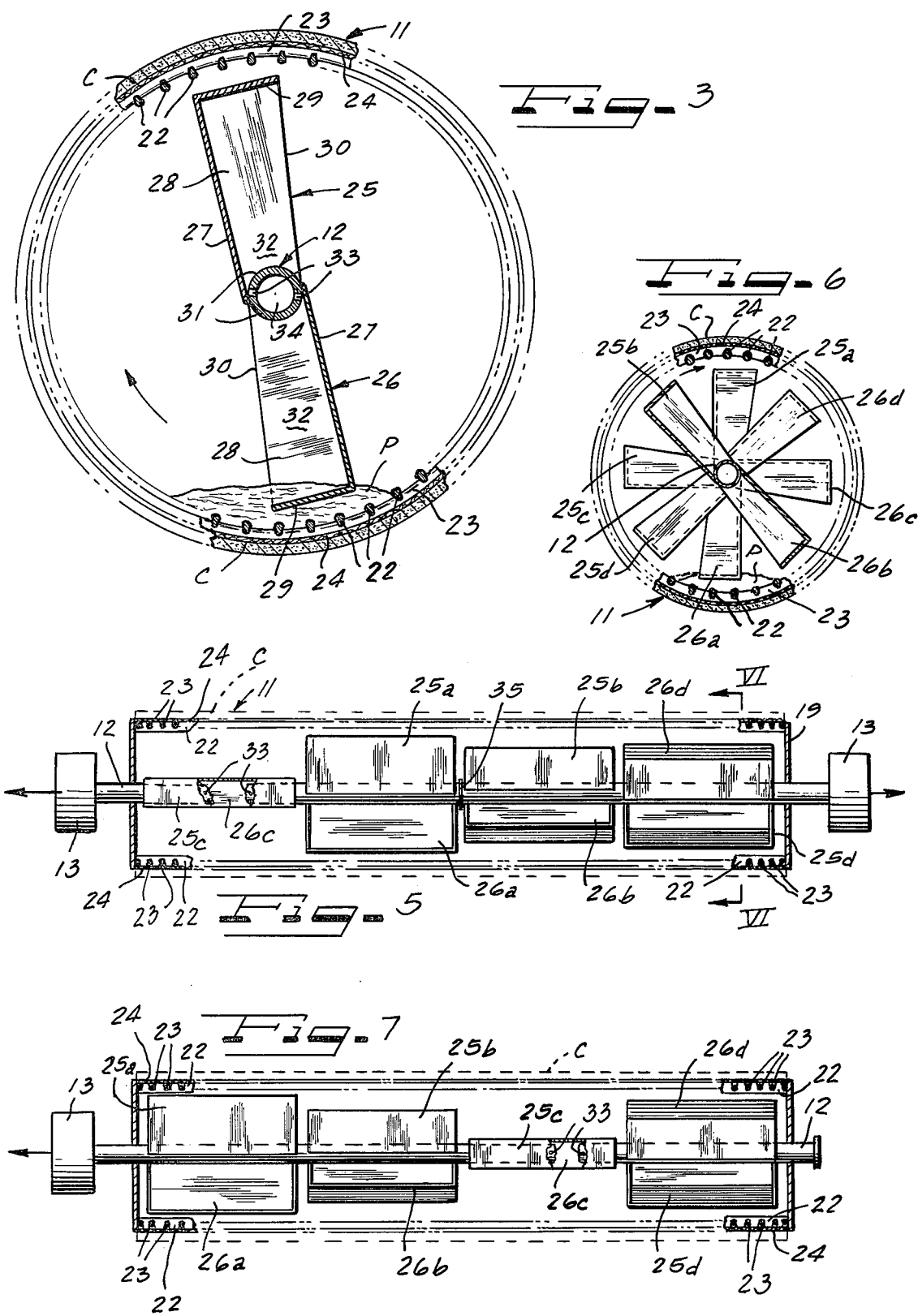

ROTARY VACUUM FILTER

FIELD OF THE INVENTION

This invention relates to the art of removing liquid such as filtrate or condensate from the interiors of rotating drums and particularly deals with rotary drum vacuum filters with scoop pans inside the drums to maintain filtrate at a low level to increase filtering efficiency and capacity of drum filter apparatus.

PRIOR ART

In the Alexander J. Doncer and Harold R. White U.S. Pat No. 3,919,088, issued Nov. 11, 1975, there is disclosed and claimed a rotary vacuum filter of the type in which this invention is very useful. In U.S. Pat. No. 3,919,088, the filtrate level in the filter drum is at or close to the axis of the drum axle through which the filtrate is drained. It would be desirable to maintain a lower filtrate level in the drum to increase filtering efficiency and capacity.

SUMMARY OF THE INVENTION

According to this invention, filtrate is efficiently scooped from the bottom of a filter drum in rotary vacuum filter apparatus of the type disclosed and claimed in the aforesaid Doncer and White U.S. Pat. No. 3,919,088 by pans mounted on and radiating from a hollow drum axle which is perforated to communicate with the pans in such a way as to minimize drainage back into the drum. The hollow axle is connected at one or both ends to pump means which create a high velocity air flow through the axle drawing the filtrate therewith and rapidly emptying the pans as they raise the filtrate to levels for draining into the axle. A filter cake is preferably built upon the drum periphery and air is withdrawn from the interior of the drum to pull filtrate through the filter cake for depositing filtered solids on the cake. A scraper acts on the filter cake to continuously remove a thin film of the cake and the deposited solids.

The scoop pans radiate from the axle into close spaced relation with the cylindrical interior periphery of the drum and are preferably arranged in diametrically opposite pairs so that when they rotate with the axle and drum, one or more pans will be on an ascending cycle raising filtrate from the bottom of the drum to a level to drain into the axle while the opposite pan or pans will be on a descending cycle entering the filtrate pond in the bottom of the drum. The pair of pans may extend the full axial length of the drum or may be divided into separate segments each, spanning only a portion of the axial length of the drum with successive segments in circumferentially offset relation so as to present a plurality of ascending and a plurality of descending pans successively draining into the axle and descending into the pond. The drainage pattern may be controlled as desired by varying the circumferential offset relationship of adjacent pairs of pans and drainage can be out of both ends of the axle or out of one end as desired. In one pan arrangement, for example, the drainage can be successively from the center pans and then to one pair of end pans followed by drainage into the opposite end pans. In another arrangement, the pans, for example, can be circumferentially offset so that they will successively drain from one axial end to the opposite axial end of the drum. The multiple or segmental pairs of pans increase the rate of entry of a pan into the pond of filtrate at the bottom of the drum to minimize raising of the filtrate level between entry of the pans.

It is then an object of this invention to provide an efficient arrangement of scoops for removing liquid from the interiors of rotating drums.

Another object of the invention is to provide a rotary vacuum filter apparatus having filtrate removing pans keeping a low level of filtrate in the bottom of the rotating filter drum.

Another object of the invention is to increase the efficiency and capacity of rotary filter apparatus by radiating pairs of filtrate drainage pans from the hollow drainage axle of the filter drum to successively enter the pond of filtrate in the bottom of the drum and to raise the filtrate to a level for draining into the interior of the hollow axle.

A further object of the invention is to provide a filter drum with diametrically opposed drainage pans radiating from the drainage axle of the drum.

A specific object of the invention is to provide a rotary filter drum with a hollow drainage axle having pans radiating therefrom in circumferentially offset relation along the length of the axle and arranged to successively scoop filtrate from the bottom of the drum and raise it to a level for draining into the axle.

Another object of this invention is to provide rotary filter apparatus with a filter drum having filtrate scoops mounted therein which raise filtrate from the bottom of the drum and drain it into an air stream flowing through a hollow drum axle.

Other and further objects of this invention will become apparent to those skilled in this art from the following detailed description of the annexed sheets of drawings which by way of preferred examples only illustrates several embodiments of the invention.

ON THE DRAWINGS

FIG. 1 is a fragmentary longitudinal sectional view of a rotary vacuum filter apparatus equipped with drainage pans of this invention.

FIG. 2 is a fragmentary transverse cross sectional view taken along the line II—II of FIG. 1.

FIG. 3 is a fragmentary transverse cross sectional view taken along the line III—III of FIG. 1.

FIG. 4 is an enlarged fragmentary transverse sectional view showing the relationship of the drainage holes and the scoop pans.

FIG. 5 is a longitudinal sectional view with parts in elevation of a scoop-pan arrangement according to this invention having a plurality of pan segments spaced along the length of the drum axle.

FIG. 6 is a transverse cross sectional view taken along the line VI—VI of FIG. 5.

FIG. 7 is a view similar to FIG. 5 but illustrating another multiple scoop-pan arrangement according to this invention.

AS SHOWN ON THE DRAWINGS

As shown in FIG. 1 the reference numeral 10 designates generally a rotary filter apparatus having a filter drum 11 mounted on a hollow through axle 12 which is rotatably supported at its ends in bearings 13. A semi-cylindrical tank 14, open at its top, receives the lower portion of the drum 11 therein. The drum 11 is driven in the tank 14 by a chain and sprocket drive 15 having a sprocket secured to the through axle 12 beyond one of the bearings 13. A rotary coupling joint 16 connects one end of the through axle 12 to a conduit 17 leading to an evacuation system such as the inlet of a pump 18 capable of evacuating the drum 11 and creating a high velocity air flow through the axle 12.

The drum 11 has end heads or plates 19, fixedly mounted on the through axle 12 by means of flanged bosses 20. These end plates 19 have rings 21 secured to the inner faces thereof around their outer eripheries and rods 22 are secured at their ends to these rings 21 connecting the end plates. The rods or ribs 22 are circumferentially spaced and define a cylindrical frame around which are mounted axially spaced hoops 23. The hoops in turn can carry circumferentially spaced longitudinal ribs (not shown). A filter cloth or screen 24 is wrapped around the hoops 23 or outer ribs if used to provide a cylindrical peripheral filter face for the drum.

The tank 11 is first filled with a slurry S of filter aid solids to form a filter cake C on the filter cloth 24 of the drum while the liquid portion of the slurry flows through the filter cloth 24 and through the spaces between the spaced hoops 23 and spaced rods 22 into the drum. After the filter cake C is formed, the tank 11 is filled with a slurry S of material to be filtered and the solids of this slurry form a film on the filter cake while the filtrate is drawn through the cake and screen into the drum to form a pond P inside the drum. Normally, this pond P would rise to a level where it could drain through an outlet at one end of the drum or into the peripheries through axle 12 and therefore the pond level would be substantially the same or only slightly depressed from the level of slurry S.

In accordance with this invention, however, the pond level can be reduced to the very bottom of the drum by a pair of diametrically opposed pans 25 and 26 mounted and radiating from the through axle 12 and spanning substantially the entire lengths of the interior of the drum 11 terminating in closely spaced relation with the end plates 19 and the rods 22.

Each pan 25 and 26, as shown in FIG. 3, has a bottom wall 27, end walls 28, radially outer sidewalls 29, open tops 30 and open inner radial sides receiving the through axle 12. The walls 28 are positioned closely adjacent the end heads 19 of the drum. The walls 29 extend into close spaced relation with the rods 22 of the drum. Clearances of ½ inch or more will prevent blockage of filtrate flow into the drum. The inner ends of the bottoms 27 and end walls 30 are welded to the axle 31 to form leakproof rigid connections.

The open tops 30 of the pans 25 and 26 face in the direction of rotation of the drum and axle as shown in FIGS. 3 and 4 so as to successively enter the pond P and scoop filtrate therefrom into the interior 32 of the pans for raising the filtrate to a level where it can drain through the open radial inner ends of the pans and through holes 33 in the through axle 12 to be swept into the high velocity air stream being pulled through the interior 34 of the axle 12 by the pump 18.

The holes 33, as shown in FIGS. 1 and 4, are arranged in two diametrically opposite rows along the entire length of the axle 12 between the end walls 28 of the pans 25 and 26. One row of holes lies adjacent the bottom 27 of the pan 25 while the other row of holes lies adjacent the bottom 27 of the pan 26. This arrangement insures complete drainage of the filtrate from an ascending pan while the holes of the diametrically opposite row communicating with the drained descending pan are high enough so that the filtrate is not drained back into the drum. Thus, as shown in FIG. 3, when the drum 25 reaches its top position, it is completely drained and although the holes 33 in the two opposite rows are at the same level, the passageway 34 is emptied below the level of the holes so that the liquid will not drain downwardly into the pan 26 which is scooping up the filtrate from the pond P.

As shown in FIG. 2, the level L-1 of the pond P in the drum 11 can be kept substantially lower than the level L-2 of the slurry S in the tank 14 to increase the drainage capacity of the drum 11 and thereby provide a more efficient and higher capacity filter apparatus.

As also shown in FIG. 2, a scraper blade 35 removes a film F of the filtered solids from the cake C together with a thin slice of the cake to present an unclogged cake surface to re-enter the slurry S. The scraped off solids slide over an apron 36 to be discharged from the apparatus.

The total area of the holes 33 in the axle 12 greatly exceeds the cross sectional area of the passageway 34, preferably by a 2 to 1 ratio, so that drainage into this passageway 34 will not be impeded.

A vacuum of about 15 – 25 inches is preferably maintained in the interior of the drum and this provides a very high air velocity steam in the passageway 34 in the order of 3,000 – 4,000 feet per minute. An air lift or sweep thus draws the liquid filtrate from the pans at a very efficient drainage rate.

As shown in FIGS. 5 and 6, the through axle 12 of the drum 11, instead of having one pair of pans 25 and 26 secured thereon along the length thereof in the drum has a plurality of pairs of shorter pans spaced along the length of the axle and positioned in circumferential offset relationship. Four such pairs of pans are illustrated with the first pair composed of diametrically opposite radiating pans 25a and 26a spanning a quadrant of the axle adjacent the left side of the midpoint of the axle, a second pair composed of pans 25b and 26b spanning a quadrant adjacent the right side of the midpoint of the axle, a third pair composed of pans 25c and 26c spanning a quadrant at the outboard ends of pans 25a and 26a and a fourth pair composed of pans 25d and 26d spanning the remaining quadrant at the outboard ends of pans 25b and 26b. The circumferential offsetting of the four sets of pans is arranged so that the pan 26a will first enter the pond P at the bottom of the drum 11 followed by the pans 26b, 26c, and 26d. This will provide a drainage pattern into the axle 13 first in a central section quadrant on one side of its midpoint, then in a central section quadrant on the opposite side of its midpoint, next in one outboard quadrant section and finally in the other outboard quadrant section. This drainage pattern is especially useful when the axle 12 is drained from both ends as shown by the arrows in FIG. 5.

If desired, as shown in FIG. 5, a plug 35 can be inserted in the midpoint of the axle 12 so that drainage of the axle passageway will be divided with the pans 25a, 26a, 25c and 26c feeding the left half of the axle while the pans 25b, 26b, 25d and 26d serve the right half of the axle.

Another quadrant pan arrangement is shown in FIG. 7 with the axle 12 draining at the left end of the drum. As shown, the pans are arranged so that the first pair 25a and 26a serve the outboard quadrant adjacent the left end of the axle, the pans 25b and 26b serve the middle quadrant on the left side of the midpoint of the axle, the pans 25c and 26c serve the middle quadrant adjacent the right side of the midpoint on the axle while the pans 25d and 26d serve the outboard quadrant at the right end of the axle. The circumferential offsetting of the pans is arranged so that drainage will occur in sequence from left to the righthand ends of the axle in the drum.

While the examples in FIGS. 5 – 7 show four pairs of pans, it will be appreciated that any desired number of pairs of pans can be provided.

The use of plural pairs of pans provides a more continuous scooping of the filtrate from the pond P making it possible to keep the level of the pond constant, since there is a smaller time increment permitting the pond to rise between successive scoops. The segmented multiple pairs of pans are drained by the same hole arrangement used for the single pair of pans 25 and 26. Thus, the axle 13 has diametrically opposite rows of holes 33 communicating with the bottom inner ends of the pans of each pair in the same manner as illustrated in FIGS. 3 and 4.

From the above description, it will be understood that this invention increases the efficiency and capacity of rotary drum filters by keeping the filtrate levels in the drums of such filters at low levels through the use of pan scoops.

I claim as my invention:

1. A rotary filter apparatus which comprises a tank for material to be filtered, a filter drum having a hollow through axle rotatably mounted for partially immersing said drum in material to be filtered in said tank, pan means mounted on and radiating from said axle in said drum in diametrically opposite pairs spaced along the length of the axle in circumferentially offset relation arranged to successively scoop filtrate from the interior of said drum and drain the scooped-up filtrate into said axle, said axle having drainage openings therethrough communicating with said pan means arranged to receive said filtrate from said pan means on the ascending cycle of rotation of the pan means and to receive air from said drum on the descending cycle of rotation of said pan means, and evacuating means for creating a high velocity air stream through said axle for sweeping filtrate with the air to empty said pan means and maintain a level of filtrate in said drum substantially lower than the level of material to be filtered in said tank.

2. The rotary filter apparatus of claim 1 wherein said pan means have flat bottoms, upstanding radial outer sidewalls, upstanding end walls, open tops, and open radial inner ends.

3. The apparatus of claim 1 wherein the drainage openings are rows of holes in the axle registering with the radial inner ends of the pan means.

4. The apparatus of claim 1 wherein the drainage openings in the axle are diametrically opposite rows of holes registering with the pan means adjacent the bottoms of the pan means.

5. The apparatus of claim 1 wherein the pan means have open radial inner ends contoured to fit partially around the axle and weld bonds secure the open inner ends of the pan ends to the axle.

6. In a rotating drum assembly accumulating liquid in the bottom of the drum, the improvement which comprises a hollow through axle supporting and rotating said drum, diametrically opposed pan means radiating from said axle into close spaced relation with the interior of the periphery of said drum and terminating sufficiently radially inward from the interior of the periphery of the drum to provide clearances accommodating filtrate flow into the drum between said pan means and said interior of the periphery of the drum and rotating with said axle and drum, means for evacuating said axle, and holes through said axle communicating with the radial inner ends of said diametrically opposed pan means adjacent the bottoms of said pan means to drain liquid from the pan means on the ascending cycle of rotation thereof and to pull air from the drum on the descending cycle of rotation of the pan means.

7. The drum assembly of claim 6 wherein the holes through the axle are arranged in diametrically opposite rows.

8. The drum assembly of claim 6 wherein the diametrically opposed pan means have open radial inner ends conforming with and welded to opposite sides of the axle.

9. The drum assembly of claim 6 wherein the holes through the axle are positioned relative to the pan means so that holes on the descending cycle of rotation will not drain liquid from the interior of the axle back into the drum.

10. The drum assembly of claim 6 wherein each pan means spans substantially the entire length of the axle inside the drum.

11. The drum assembly of claim 6 wherein a plurality of pairs of diametrically opposed pan means are secured along the length of the axle with successive pan means in circumferentially offset relation.

12. The drum assembly of claim 11 wherein the offset relation of the pan means is such as to successively scoop liquid from the bottom of the drum to maintain a low level of liquid in the drum.

13. The drum assembly of claim 6 wherein a plurality of pairs of diametrically opposite pan means are spaced along the length of the axle with each pair being circumferentially offset from an adjacent pair to provide a succession of pans scooping up liquid from the bottom of the drum on the descending cycle and draining liquid into the axle on the ascending cycle.

14. The drum assembly of claim 13 wherein the circumferential offset relationship of the pairs of pans is such as to successively scoop liquid from the interior of the drum at the midpoint of the drum and then at the outboard ends of the drum.

15. The drum assembly of claim 13 wherein the offset relationship of the pans is such as to successively scoop liquid from the interior of the drum from one axial end to the opposite axial end on the descending cycle and to successively drain the scooped up liquid into the axle in the same sequence.

16. The drum assembly of claim 6 wherein the axle is evacuated from both ends.

17. A rotary filter drum which comprises a hollow through axle, longitudinally spaced end plates mounted on said axle, circumferentially spaced longitudinal rods mounted at their ends on the peripheries of said end plates and cooperating to define a cylindrical peripheral frame for said drum, longitudinally spaced circumferentially hoops mounted on and surrounding said rod, a filter cloth wrapped around said hoops forming a peripheral filter surface on said drum, scoops mounted on and radiating from said axle into close spaced relation with said rods in said drum, said scoops having bottom, side and outer radial end walls, open tops and open inner radial ends, said outer radial end walls being spaced sufficiently radially inward from said rods in the drum to provide clearances accommodating filtrate flow into the drum between the end walls and filter cloth, holes in said axle along the length thereof registering with the open inner ends of said scoops adjacent the bottoms thereof, and said scoops rotating with said drum and axle, adapted in operation to rotate through a pond of filtrate in the bottom of the drum lifting the filtrate to a level for draining into the axle.

18. The filter drum of claim 17 wherein the scoops are arranged in diametrically opposite relation along the opposite sides of the axle.

19. The drum of claim 17 wherein the scoops are arranged in a plurality of pairs spaced along the length of the axle.

20. The drum of claim 17 wherein the scoops span substantially the entire length of the axle in the drum.

* * * * *